Figure 1:
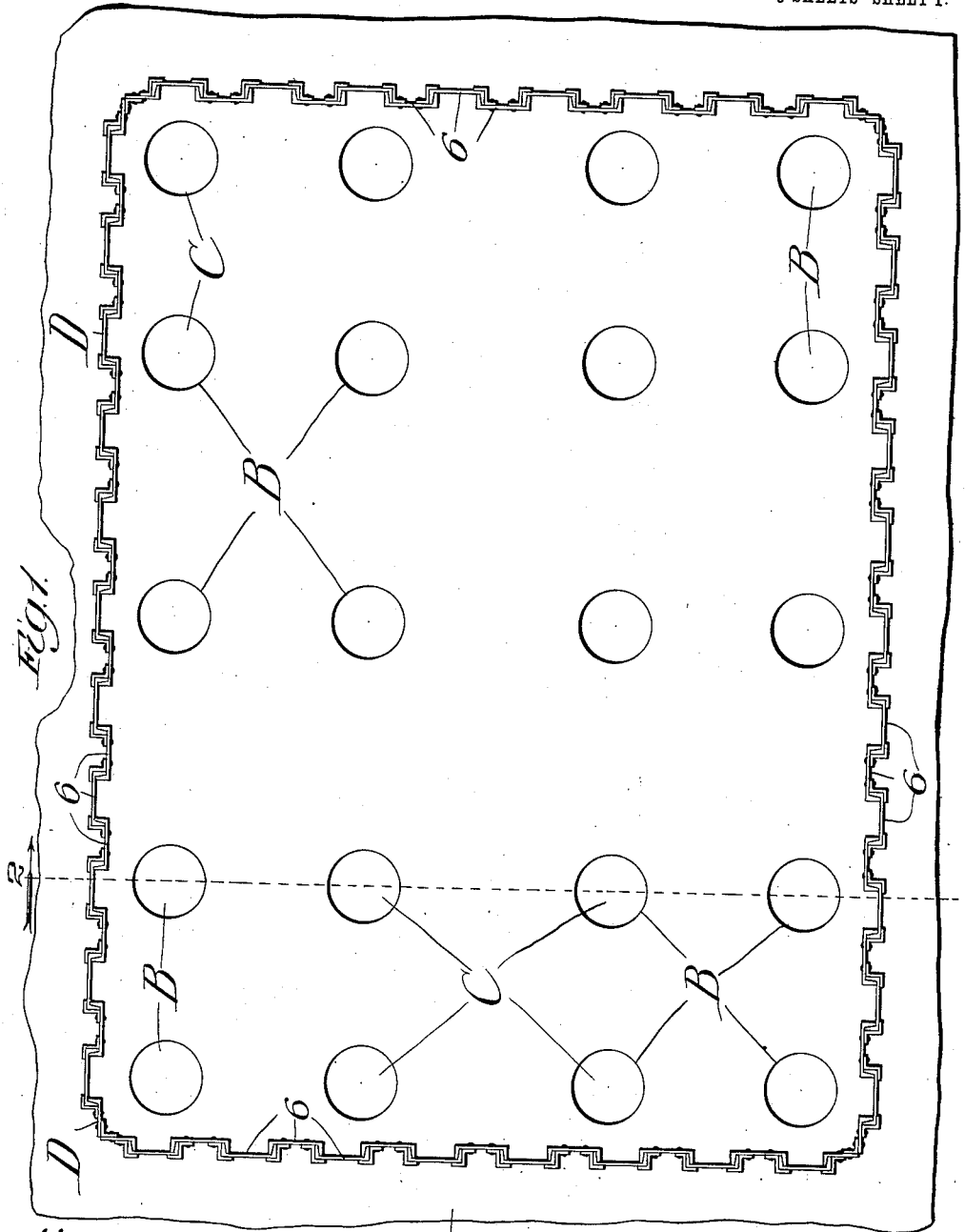

No. 832,964. PATENTED OCT. 9, 1906.
L. P. FRIESTEDT.
CONSTRUCTION OF BUILDINGS.
APPLICATION FILED NOV. 19, 1904.

5 SHEETS—SHEET 1.

Witnesses:
Chas. L. Taylord.
John Endere.

Inventor:
Luther P. Friestedt,
By L. B. Coupland.
Atty.

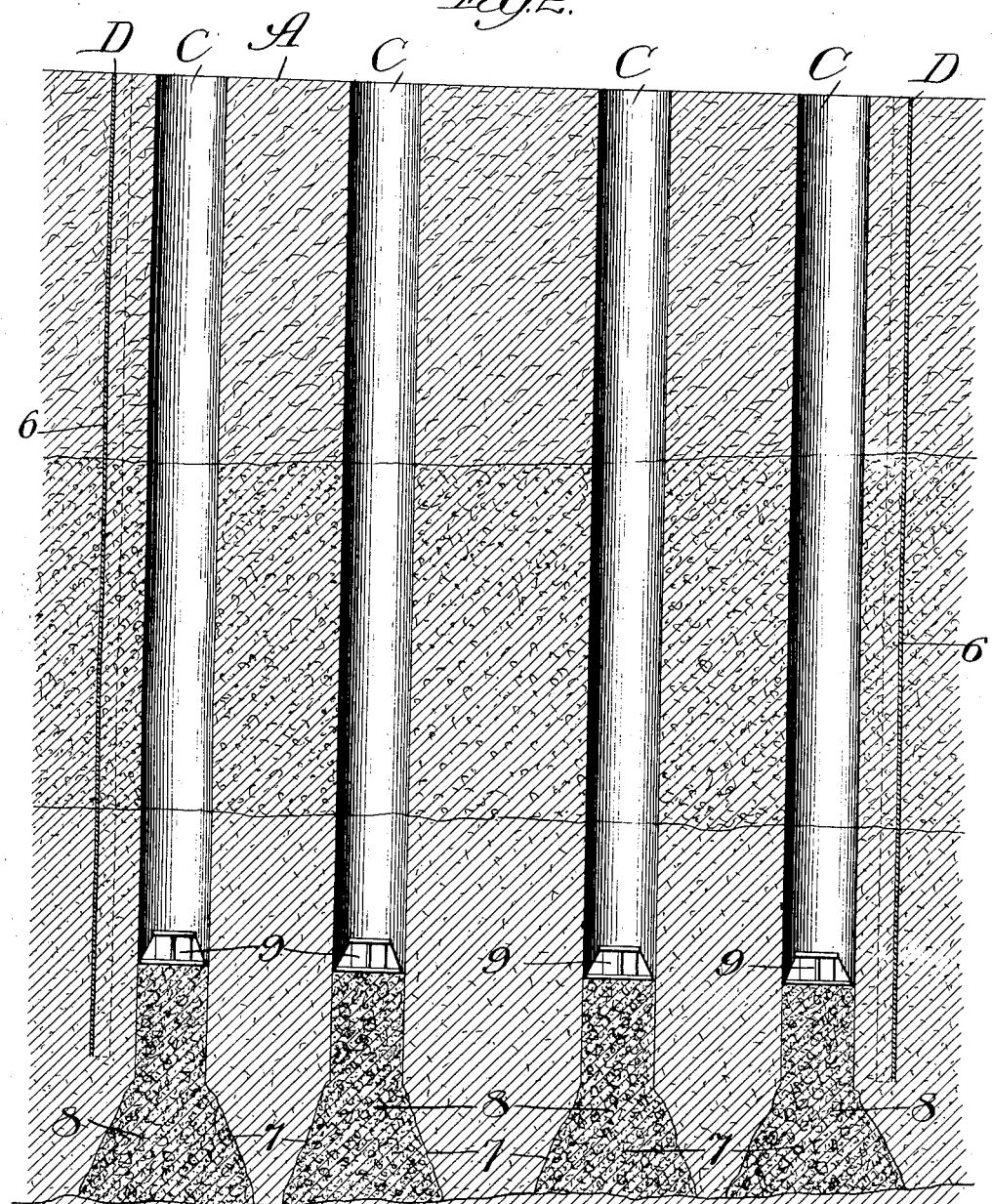

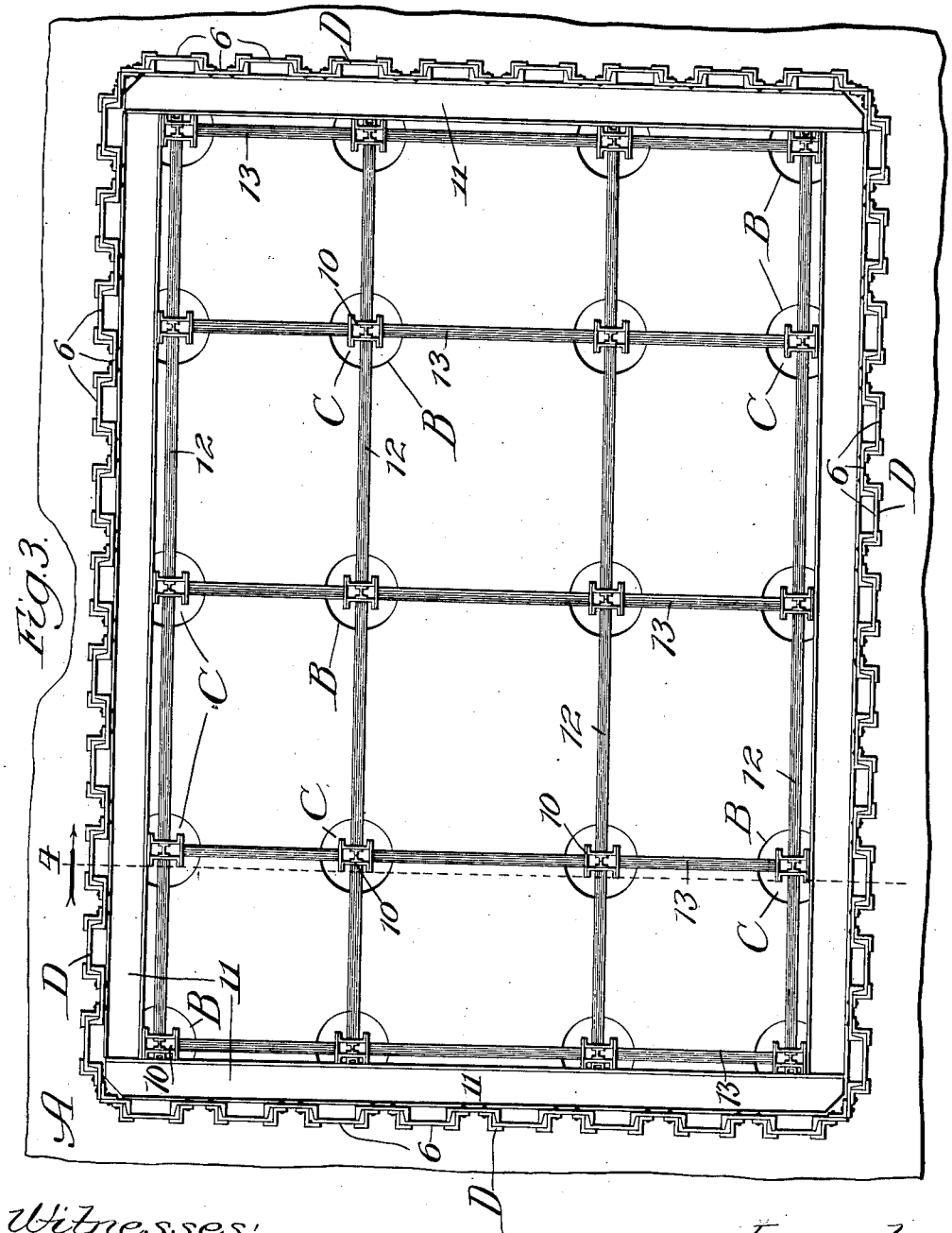

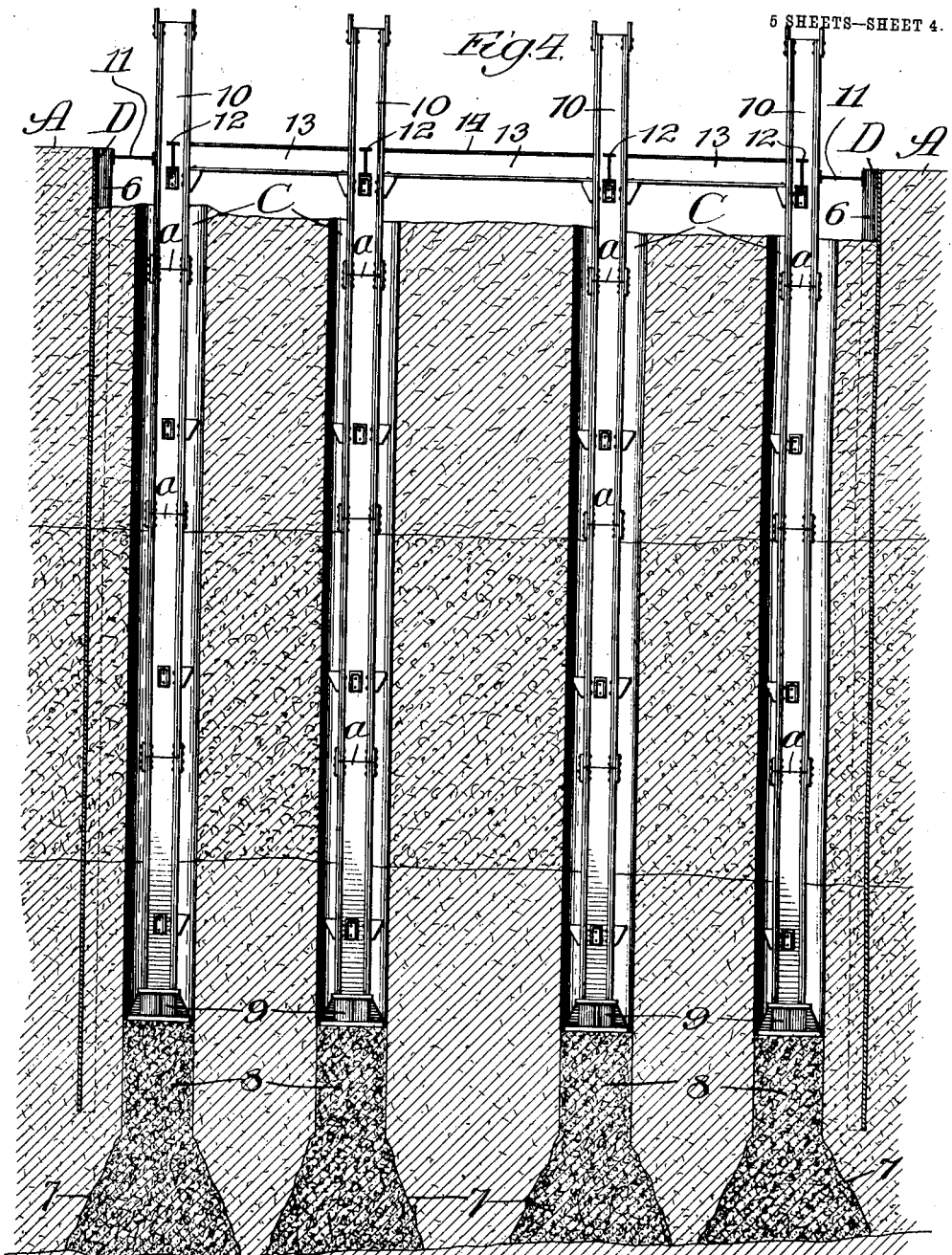

No. 832,964. PATENTED OCT. 9, 1906.
L. P. FRIESTEDT.
CONSTRUCTION OF BUILDINGS.
APPLICATION FILED NOV. 19, 1904.
5 SHEETS—SHEET 5.
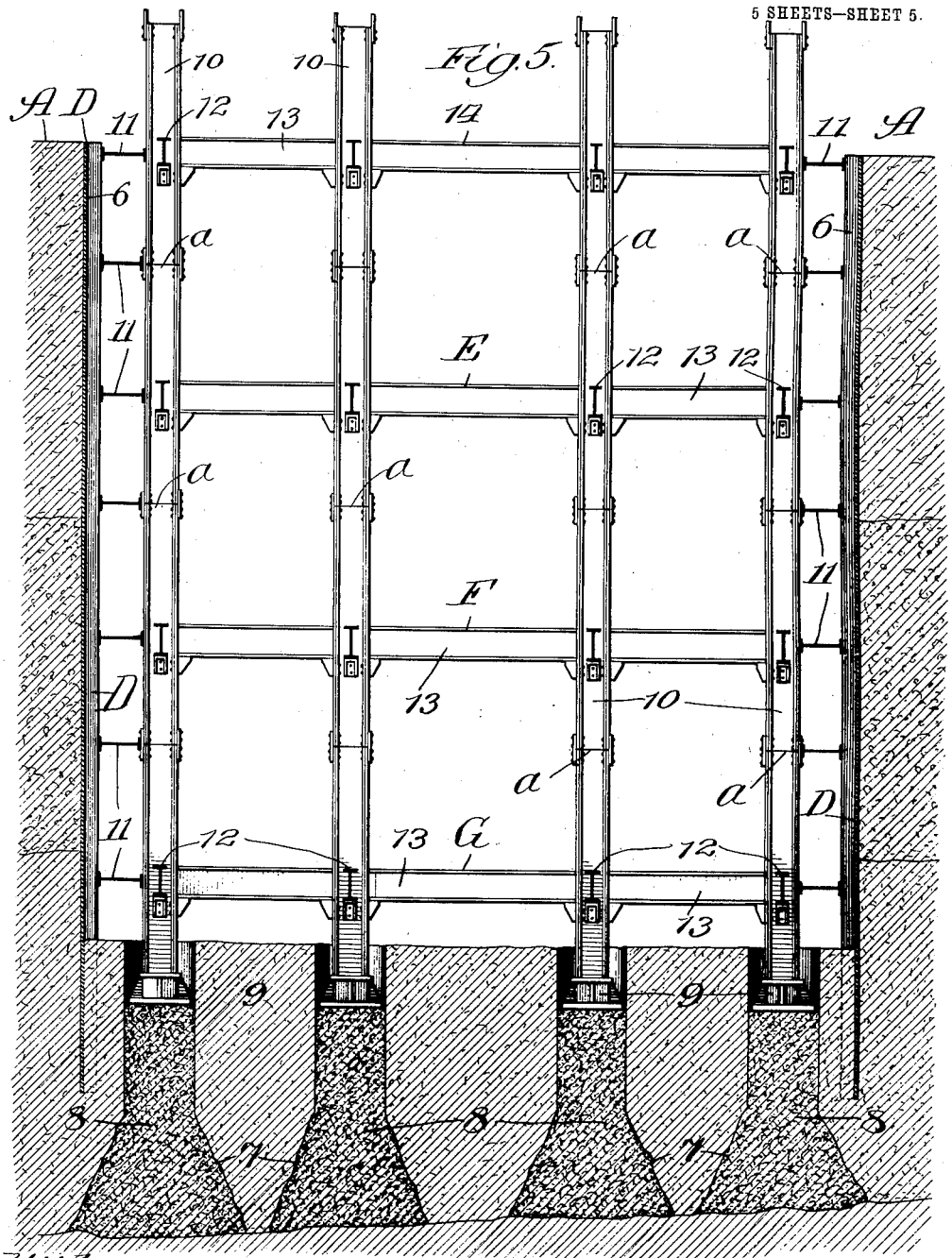
Witnesses:
Chs. E. Gaylord.
John Enders.
Inventor:
Luther P. Friestedt,
By L. B. Coupland.
Attys.

UNITED STATES PATENT OFFICE.

LUTHER P. FRIESTEDT, OF CHICAGO, ILLINOIS.

CONSTRUCTION OF BUILDINGS.

No. 832,964.　　　　Specification of Letters Patent.　　　　Patented Oct. 9, 1906.

Application filed November 19, 1904. Serial No. 233,440.

*To all whom it may concern:*

Be it known that I, LUTHER P. FRIESTEDT, a citizen of the United States, residing at Chicago, in the county of Cook and State of Illinois, have invented new and useful Improvements in the Construction of Buildings, of which the following is a specification.

The subject-matter of this invention relates to the construction of buildings, and more especially to deep foundations and subterranean construction.

Many circumstances have combined within a brief period of time that call for needed improvements in the art of building construction in order to conform to the changing conditions and requirements of modern progress. The constantly-increasing real-estate values in large cities and the congested conditions that necessitate the transaction of a large volume of business within a circumscribed area may be enumerated as some of the circumstances. These conditions also call for the erection of high, light, and substantial buildings which require stable foundations of more than the ordinary character. By way of illustration, instance the city of Chicago, where the geological formation of the earth strata for the support of heavy structures is very poor and the cause of much worriment among architects and builders. A number of the highest steel structures have been erected in this city, and the uneven and unusual settling has been in some cases alarming, and in one particular instance a high and weighty tower had to be entirely taken down and foundations strengthened in other instances. The formation of the earth strata must also be carefully considered and studied, so that what is lacking in the natural foundation must be provided for artificially.

The value of real estate in large cities and the concentration of buildings in order to facilitate and expedite the transaction of business have made the utilization of subterranean space a prime necessity by extending stories underground. This use of underground space carries with it some provisional requirements, such as a safe and substantial foundation that will occupy the least possible space in the substructure, fireproof construction, and the avoiding of undermining the foundations and injuring the adjoining buildings when excavating for a new structure.

The strata that underlie the city of Chicago are largely of a soft yielding nature, and especially a dangerous quicksand element, which must be shut out in order to practically utilize underground space. When the main difficulties met with have been overcome, the use of below-ground space is made possible by reason of the established elevator service, electric lighting, and the system of ventilation.

The object, therefore, of this invention is to provide a method of and means for successfully surmounting the difficulties and obstacles that may be encountered in the work of putting in deep foundations and providing for the utilization of underground space for business purposes.

In the drawings, Figure 1 is a plan showing preliminary steps embodying the improved features. Fig. 2 is a vertical section on line 2, Fig. 1, looking in the direction indicated by the arrow. Fig. 3 is a plan showing advanced steps over that illustrated in Fig. 1. Fig. 4 is a vertical transverse section on line 4, Fig. 3; and Fig. 5 is a sectional elevation, showing features omitted in Fig. 4.

The present showing is limited to the underground system of construction, A indicating the datum-line in the vertical sections and the earth-surface in the plan views. The circles B in Figs. 1 and 3 indicate the relative position of the caisson foundation-shafts C. The relative position of these shafts may be varied and the number of the same more or less governed by circumstances.

Ordinarily the first step in the method of procedure will be to inclose the site for the foundation with a retaining-wall D, composed of metal-beam piling-sections 6, interlocked edgewise and driven into the earth, forming a continuous solid wall that is impervious to water, quicksand, or other earthy matter of a semiliquid composition. This sheet-piling can be extended down to any desired depth and is driven into place by means of the ordinary pile-driver. This wall not only provides a curbing, but also forms a substantial part of the foundation substructure. It also has the functions of a retaining-wall as against doing injury to the foundations of adjoining buildings while excavating for a new structure. The retaining feature of the wall D is an exceedingly valuable one, as it effectively guards against serious losses and will often prevent long delays and avoid trouble when erecting new structures alongside of buildings already in place. The ease and facility with which the sheet-piling can be placed in position is another important factor as a time-saver.

It will be understood that no preliminary excavating is necessary before driving the sheet-piling forming the retaining-wall, the latter being the first step in the operation.

The next step in the operation will be the sinking of the caisson-shafts C, which is done in the usual manner and the enlarged bottom portion 7 filled in solidly with a concrete body 8 of any suitable composition. The foundation-filling is surmounted by base-caps 9, on which rest the lower ends of the foundation columns or piers 10. These columns for the support of the superstructure are composed of metal beams built up and joined together in sections and usually breaking joints between floors, as at $a$. The term "substructure" is more particularly used with reference to the underground floor-space.

A number of horizontal brace-beams 11 are interposed between the sheet-piling wall D and the outside or border row of the columns 10. These brace beams or walls will ordinarily be made continuous, forming a solid framework clear around the structure, as best shown in Fig. 3. The beams 11 are disposed at intervals, Fig. 5, relative to their vertical position in the substructure and are rigidly secured in placed by any suitable means, such as rivets or bolts. This feature not only greatly strengthens the foundation substructure, but also permits of all the earth being removed from the inner or face side of the retaining-wall and increases the space area. The retaining-wall is now the outside inclosing wall of the subterranean stories and being water-tight prevents seepage and consequent settling of the structure. The particular purpose for which the underground portion of a building is to be used may permit of minor changes being made in details of construction—as, for instance, the brace-beams 11 instead of being put in solid, as shown, may be divided into a series of small sections, with intervening spaces when lightness of construction is possible. The particular formation of the earth, whether solid and rocky or of a loose and yielding stratum, must be taken into consideration when arranging details, so that minor changes may be made that fall within the scope of the major construction features; neither is it always necessary to remove the earth wall between the border columns and the retaining-wall, as the earth wall can be faced up and retained when some particular adaptation may require it.

The floor-supports consist of the longitudinal metal girders 12 and the transverse girders 13, all rigidly secured to the foundation-columns. Three stories are shown, Fig. 5, below the first or ground floor 14 and will be designated as floors E, F, and G. The number of underground stories may be greater or less in accordance with the amount of space required.

The retaining-wall and the foundation-piers being in place, the next step is to remove the earth (shown in Fig. 4) to a depth corresponding to the level of floor E. The girders are then put in for the floor E and the brace-beams 11 inserted in place down to the same level. The excavation of the earth is then continued down to the location for the next floor F and the different girders and brace-beams placed in position for that floor, and finally the excavation is continued down to the lowermost floor G and the last series of girders and beams set in place. As the earth inclosed by the retaining-wall is removed the caisson-shafts vanish, so that when the operation is completed a steel framework rigid, light, firmly anchored in the earth, indestructible by fire, riveted and joined into an inseparable skeleton is presented. By this method each floor is solidly braced against any lateral pressure or thrust as the operation of assembling the different parts progresses, making it unnecessary to side-shore or put in any temporary bracing, as between the interlocking steel retaining-wall and the other parts. The workmen have the advantage of standing on an earth floor in riveting or otherwise fastening the different metal beams together. This permits of the work being done to the best advantage and with the utmost facility, dispenses with scaffolding and the ever present danger attending the use of the same.

A building-foundation can be extended down until a solid base can be provided and at the same time the cost maintained within a limit that is much less than that ordinarily expended for the same purpose. By this method and means it is also possible to have as many stories underground as is practical and at the same time perfectly safe, and space utilized for commercial purposes that is not now available under present existing conditions.

The retaining-wall of sheet-piling may be dispensed with in some instances, as when a solid rocky formation is encountered, which can only be removed by blasting. The steel piling can be driven down to bed-rock easily and then lowered to a greater depth by excavating when necessary. The retaining-wall may also be dispensed with when there are no adjoining buildings and none likely to be erected, providing, of course, that the natural foundation is of a substantial character.

In building operations in Chicago nothing can be dispensed with that will go toward the insurance of a stable foundation, as the yielding nature of the earth strata—such as underground streams and pools, shifting sands, and many lesser conditions of instability— are met with and have to be overcome and an indestructible foundation anchorage assured. New York, Philadelphia, St. Louis, and other cities are underlaid with solid rock and granite outcroppings and have none of the unfavorable conditions mentioned to contend with, except in a few isolated instances.

A detailed description of the specific form of metal sheet-piling used is omitted, as that is fully set forth in a number of patents granted to me.

When the structure is not to be provided with underground stories, the expense and labor of sinking caisson-shafts may be dispensed with, as the retaining-wall will permit of the entire body of earth inclosed being removed and a larger area uncovered for putting in the foundation-base.

Where a structure is provided with stories below ground, it will be readily understood with what facility subways, tunnels, sewer, water, or other pipes may be run through the building without disturbing or injuring the foundation.

Having thus described my invention, what I claim is—

1. The method herein described for constructing underground stories, which consists in first putting in the supporting foundation-piers, next excavating to the required depth for the first story, then putting in the floor-girders then continuing the excavation down for the second story, then putting in the floor-girders therefor, and so on continuously in accordance with the number of stories to be located underground, thereby making each floor-framing a rigid brace against any lateral pressure or thrust.

2. The method herein described for putting in foundations and underground stories, which consists in first inclosing the site with a retaining-wall of sheet-piling driven to the desired depth, next setting the foundation-columns, then excavating to a depth for the first story, then putting in the floor-girders and permanent brace-beams then continuing the excavation for the second story and inserting the floor-girders and brace-beams and so on in accordance with the number of stories to be located underground.

3. A building structure and foundation therefor, comprising a retaining-wall composed of sheet-piling driven into the earth and inclosing the foundation site, the supporting foundation-columns, the floor-girders secured to the foundation-piers at intervals and dividing the underground space into stories and the brace-beams inserted between the retaining-wall and the border row of columns.

In testimony whereof I have signed my name to this specification in the presence of two subscribing witnesses.

LUTHER P. FRIESTEDT.

Witnesses:
  L. B. COUPLAND,
  G. E. CHURCH.